(12) United States Patent
Usui et al.

(10) Patent No.: US 6,403,661 B1
(45) Date of Patent: Jun. 11, 2002

(54) VOLUME REDUCING AGENTS FOR EXPANDED POLYSTYRENE, METHODS AND APPARATUS FOR PROCESSING EXPANDED POLYSTYRENE USING THE SAME

(75) Inventors: Hiroaki Usui, Tokyo (JP); Jae-Hong Kim; Dong-Hoon Choi, both of Seoul (KR); Yoshiharu Kimura, Kyoto; Kenya Motoyoshi, Tokyo, both of (JP)

(73) Assignee: Victech Co., Ltd., Seoul (KR)

( * ) Notice: Subject to any disclaimer, the term of this patent is extended or adjusted under 35 U.S.C. 154(b) by 0 days.

(21) Appl. No.: 09/737,815

(22) Filed: Dec. 18, 2000

(51) Int. Cl.$^7$ .................................................. C08J 11/04
(52) U.S. Cl. ............................. 521/47; 521/60; 521/146
(58) Field of Search .............................. 521/47, 146, 60

(56) References Cited

U.S. PATENT DOCUMENTS 5,145,877 A * 9/1992 Bopp et al. .................... 521/42
5,147,894 A * 9/1992 Bopp et al. .................... 521/42
5,200,432 A * 4/1993 Bopp et al. .................... 521/42
5,594,035 A * 1/1997 Walsh ........................... 521/42

* cited by examiner

*Primary Examiner*—Morton Foelak
(74) *Attorney, Agent, or Firm*—Robert E. Bushnell, Esq.

(57) ABSTRACT

A volume reducing agent for processing expanded polystyrene (EPS), containing 65–97 wt % of a first plasticizer having a solubility parameter less than the solubility parameter of the polystyrene; and 3–35 wt % of a second plasticizer having a solubility parameter higher than the solubility parameter of the polystyrene. The volume reducing agent is in a liquid state, has a Ferdor solubility parameter close to that of the polystyrene to be processed in the mixed state and transfers the resulting materials having reduced volume into gel-type products to be floated and easily separated to yield a high quality output of recycled expanded polystyrene (FPS).

9 Claims, 4 Drawing Sheets

VOLUME REDUCING AGENTS FOR EXPANDED POLYSTYRENE, METHODS AND APPARATUS FOR PROCESSING EXPANDED POLYSTYRENE USING THE SAME

BACKGROUND OF THE INVENTION

1. Field of the Invention

The present invention relates to a volume reducing agent for expanded polystyrene (EPS), methods and apparatus for processing EPS using a volume reducing agent to reduce the volume of EPS known as bulky waste, as well as to recycle used EPS and recover high quality polystyrene.

2. Description of the Related Art

EPS, also known as foamed styrene, has excellent thermal-protective or insulating properties and buffering effects. EPS is used throughout the world for a variety of different purposes including, for example, but not limited to transport packaging boxes for sea foods and shock-absorbing packing materials contained in package for home appliances.

EPS product is generally bulky, potentially causing disposal problems. For example, burning disposal of EPS can interfere with operation of a combustion furnace, and also has the problem of producing harmful gases. An additional problem of EPS having bulky property (or voluminous nature) is that there is a high vehicular transportation cost. Because EPS is normally soluble in some organic compounds such as aromatic hydrocarbons, hydrocarbon halides, etc., a particular disposal plant may be designed which enables waste EPS to be dissolved. However, such a plant must be run on a large scale and there are known potential environmental problems deriving from the resulting liquid product.

Another potential disposal process uses limonene, which can dissolve EPS completely. However, limonene has very low ignition point of 48° C. and a strong odor, volatility and high consumption of limonene per EPS to be dissolved, all of which are undesirable properties. As a result, limonene is considered an undesirable compound to be used within disposal plant with respect to safety and environmental concerns.

Due to restricted rules regarding a clean environment in recent years, a recycling process for used EPS or methods of increasing recycling capability have considered a most urgent necessity. In response to this need, the inventors have developed a safe and effective recycling process of EPS as a result of intensive studies to solve the aforementioned problems based on the concept of reducing the volume of EPS, rather than dissolution.

SUMMARY OF INVENTION

Accordingly, an object of the present invention is to provide a safe and effective method for volume reducing of EPS and to raise recycling capability thereof.

According to one aspect of the present invention, there is provided a volume reducing agent for processing EPS, containing a first plasticizer having a solubility parameter less than the solubility parameter of the polystyrene; and a second plasticizer having a solubility parameter higher than the solubility parameter of the polystyrene, wherein the agent is in a liquid state, has the solubility parameter in the mixed state close to that of polystyrene to be processed, and transfers the resulting materials having reduced volume into gel-type products to be floated and easily separated.

According to another aspect of the present invention, there is provided a method for processing EPS including the steps of: preparing a volume reducing agent, the volume reducing agent containing a first plasticizer having a solubility parameter less than the solubility parameter of the polystyrene, and a second plasticizer having a solubility parameter higher than the solubility parameter of the polystyrene, wherein the agent in the mixed state is in a liquid state, has the solubility parameter close to that of polystyrene to be processed and transfers the resulting materials having reduced volume into gel-type products to be floated and easily separated; dipping in the volume reducing agent EPS that may be crushed and be in a status having a specific shape or nonspecific shape to thereby reduce the volume of the EPS; and dipping the volume-reduced EPS in a neutralization solution to thereby obtain recycled EPS material.

According to still another aspect of the present invention, there is provided an apparatus for processing EPS by using a volume reducing agent. The apparatus includes: a main vessel in which the volume reducing agent is under-filled and pre-crushed EPS in shape or shapeless states that are permeated into the volume reducing agent; and an entrapping device for soaking the EPS into the volume reducing agent and entrapping the EPS in a gel type floating state.

It is to be understood that both the foregoing general description and following detailed description are exemplary and explanatory and are intended to provide further explanation of the invention as claimed.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, and wherein.

DETAILED DESCRIPTION OF THE PREFERRED EMBODIMENTS

In order to accomplish the above captioned object, the present invention involves a volume reducing agent for processing EPS having solubility parameter close to that of polystyrene (PS). The solubility parameter of polystyrene varies from 8.5 to 10.3 $(cal/cm^3)^{1/2}$ at the room temperature and atmosphere pressure, based on the Ferdor method. This can be referred to as the Ferdor solubility parameter. The volume reducing agent is prepared by blending a first plasticizer having solubility parameter less than that of polystyrene by 1–3 $(cal/cm^3)^{1/2}$, that is, having a higher solubility than polystyrene, and a second plasticizer having the solubility parameter higher than that of polystyrene by 1–3 $(cal/cm^3)^{1/2}$, that is, having lower solubility.

Also, the present invention relates a method for processing the EPS which is to be re-used, the method comprising permeating (or infiltrating) EPS materials in shape or shapeless states prepared by preliminary crushing treatment into the volume reducing agent, then soaking the result product into an affinity solution to obtain the re-usable polystyrene product which can be easily changed into polystyrene.

Furthermore, the present invention involves an apparatus for processing EPS by using the volume reducing agent. The apparatus includes an under-filled vessel in which the volume reducing agent is under-filled and pre-crushed or pulverized EPS in shape or shapeless states can be permeated into the volume reducing agent, and a device for entrapping EPS in a suspended state the role of which soaks EPS into the volume reducing agent within the main vessel and reduces the volume of EPS for certain period, then entraps EPS in a gel state.

Figure 1:
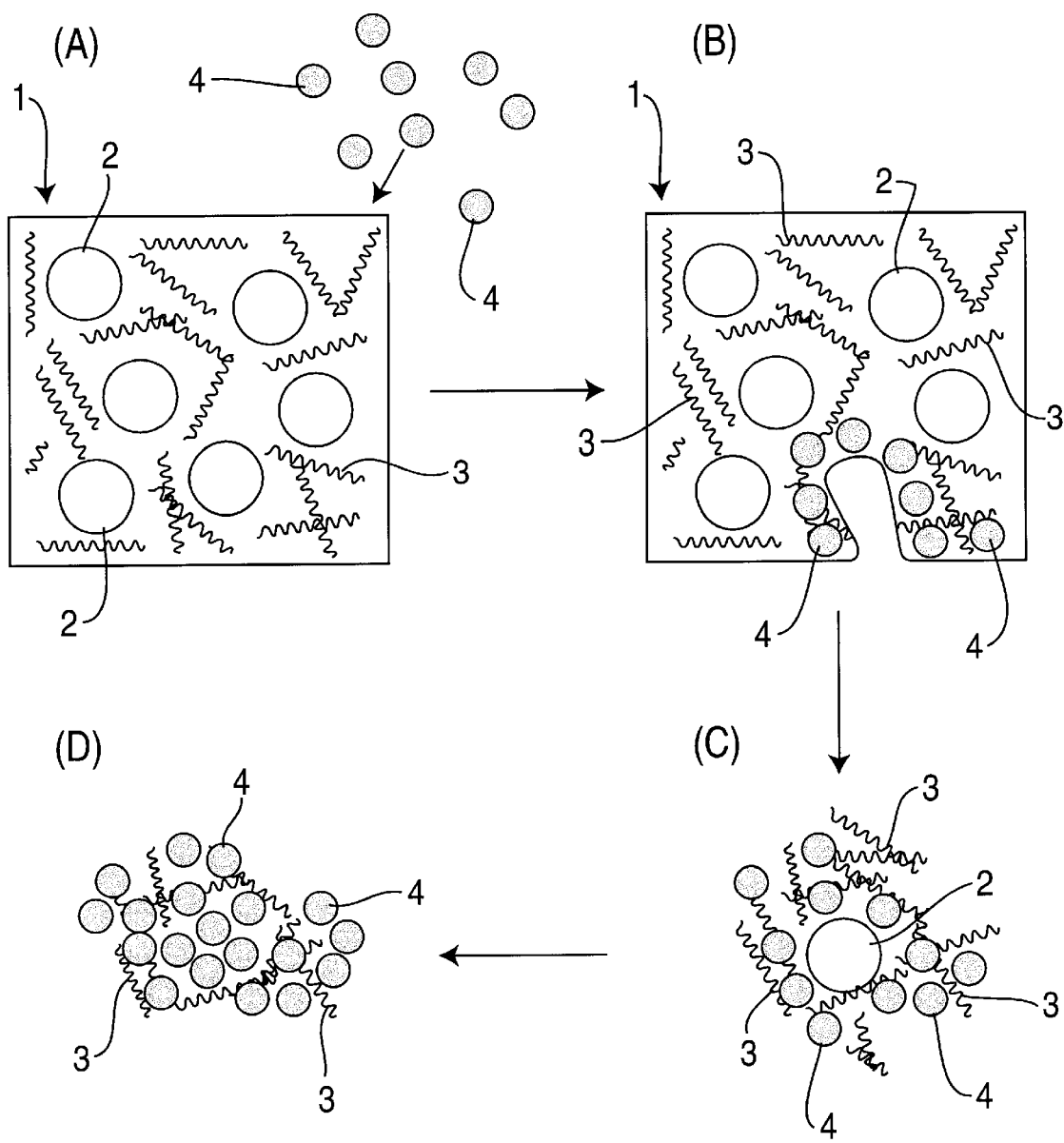
FIG. 1 illustrates a volume-reducing process orderly performed using a volume reducing agent in an embodiment according to the present invention.

A preferred embodiment of the present invention will be hereinafter explained with reference to the appended FIG. 1 and FIG. 2 which, however are not intended to be limiting of the present invention.

The present inventors took notice as to the characteristics of organic solvent having, though they can not serve to fully dissolve polystyrene based organic materials, the solubility parameter close to the sufficient level to dissolve the organic materials to be loose and promote the volume reduction and the plasticizing reaction of the organic materials, especially EPS. In other words it was experimentally found that the gelling or plasticizing reaction of polystyrene-based organic materials, despite non-dissolving of the materials, can be accomplished by mixing the first plasticizer of the improved affinity to organic polymers and serving to loosen polymer chains by the penetration of the plasticizer into molecules of polymers and the second plasticizer of the lower affinity to organic polymers and serving to contract and/or coagulate (or condense).

Accordingly, a volume reducing agent of the present invention has the solubility parameter ranged from 8.3 to 10.3 $(cal/cm^3)^{1/2}$, close to that of polystyrene, to be applied in a blended state made by blending the first plasticizer having a solubility parameter less than that of polystyrene, that is, having higher solubility and the second plasticizer having a solubility parameter more than that of polystyrene, that is, having lower solubility.

The first plasticizer includes but not is limited to dicarbonate diesters such as diethyl adipate, dimethyl adipate, dimethyl glutarate, dibuthyl adipate, dimethyl succinate, di-n-propyl adipate, diisopropyl adipate and the like, and carbonate esters such as ethyl acetate, n-propyl acetate and the like which may be selectively used alone or in admixture thereof.

The second plasticizer used in the present invention includes but is not limited to amino alcohol existing in liquid state at normal temperature without dissolving polystyrene such as one, two and three substituents for nitrogen )roup of amines. Examples of such amines includes but are not limited to triethanolamine, trimethanolamine, diethanolamine and the like, and solvents consisting of alcohols such as ethylene glycol, diethylene glycol, ethylene glycol monomethylether and the like, and esters such as γ-butyrolactone, ethylene carbonate, dimethyl phthalate and the like may be used alone or in admixture thereof.

Such prepared volume reducing agent is applied to EPS 1 in a coagulated state illustrated in FIG. 1A. The EPS 1 contains a large amount of bubbles 2 and polymer ingredient 3, and volume reducing agent 4 applied to EPS 1 is penetrated within the EPS 1 and serves to force polymer ingredient 3 outward and to extend due to the action of the first plasticizer of the volume reducing agent as shown in FIG. 1B, and simultaneously to contract and condense polymer ingredient 3 by the effect of the second plasticizer of the volume reducing agent, yielding the collapse of bubbles 2 as shown in FIG. 1C. Finally, EPS 1, after completion of the gelling or plasticizing process, can be reduced in by volume reducing agent 4 as shown in FIG. 1D.

In addition, as the result of testing different compounds as the first and second plasticizers to be selectively combined together to produce volume reducing agent, it was found that a dicarbonate diester such as dimethyl glutarate (having solubility parameter of 9.75), dimethyl adipate (having solubility parameter of 9.64), dimethyl succinate (having solubility parameter of 9.88) and the like may be most preferably used as the first plasticizer having a solubility parameter close to that of polystyrene to be applied (see the following definition).

<Definition 1>

10.1 $(cal/cm^3)^{1/2}$, 17.5 $MPa^{1/2}$ for commonly used polystyrene for packing material. The solubility parameter of polystyrene actually varies from 8.56–10.3 $(cal/cm^3)^{1/2}$, or 17.4–20.1 $(MPa)^{1/2}$ for different applications due to easy variation of the polymer structure.

Likewise, it was also found that the most efficient compounds as the second plasticizer of the present invention were ethylene glycol (solubility parameter 14.8) and triethanolamine (solubility parameter 15.6). The solubility parameter was calculated by Ferdor's method and may be slightly changed, based on the adapted parameter at the condition of temperature and pressure.

Among different solvents previously described, solvents having the solubility parameter ranging from 8.0 to 10.5 may be used as the first plasticizer. Example of such solvents includes but is not limited to diethyl phthalate (10.0), dimethyl sebacinate (9.48), diethyl sebacinate (9.4), tricresyl phosphate (9.7), epoxin stearate (9.7), butyl oleate (9.5), ethylene glycol diacetate (10.0) and the like. As noted earlier, solvents having the solubility parameter value in the range of 1 to 3 $(cal/cm^3)^{1/2}$ less than that of polystyrene, for example, from 7.1 to 10.0 $(cal/cm^3)^{1/2}$ based on polystyrene having a value of 10.1, may be used as the first plasticizer.

Likewise, as the second plasticizer, solvents having a solubility parameter value of at least 10.5 such as dimethyl phthalate (10.9), diethylene glycol (12.6), and ethylene carbonate (14.7) may be used in the present invention. As noted earlier, solvents having the solubility parameter value in the range of 1 to 5 $(cal/cm^3)^{1/2}$ greater than that of polystyrene, for example, from 11.1 to 15.6 $(cal/cm^3)^{1/2}$ based on polystyrene having a value of 10.1, may be used as the second plasticizer.

From the result of another test for the above plasticizers it was understood that the volume reducing agent consisting of the first and second plasticizers includes ionic agent, or certain forms of tourmaline, and may be treated with supersonic wave, or ultrasonication, to enhance or promote infiltration and separation of EPS.

Turning to the drawings, the exemplary embodiment of the method and apparatus for using the volume reducing agent for EPS are explained with reference to the accompanying drawings.

Figure 2:
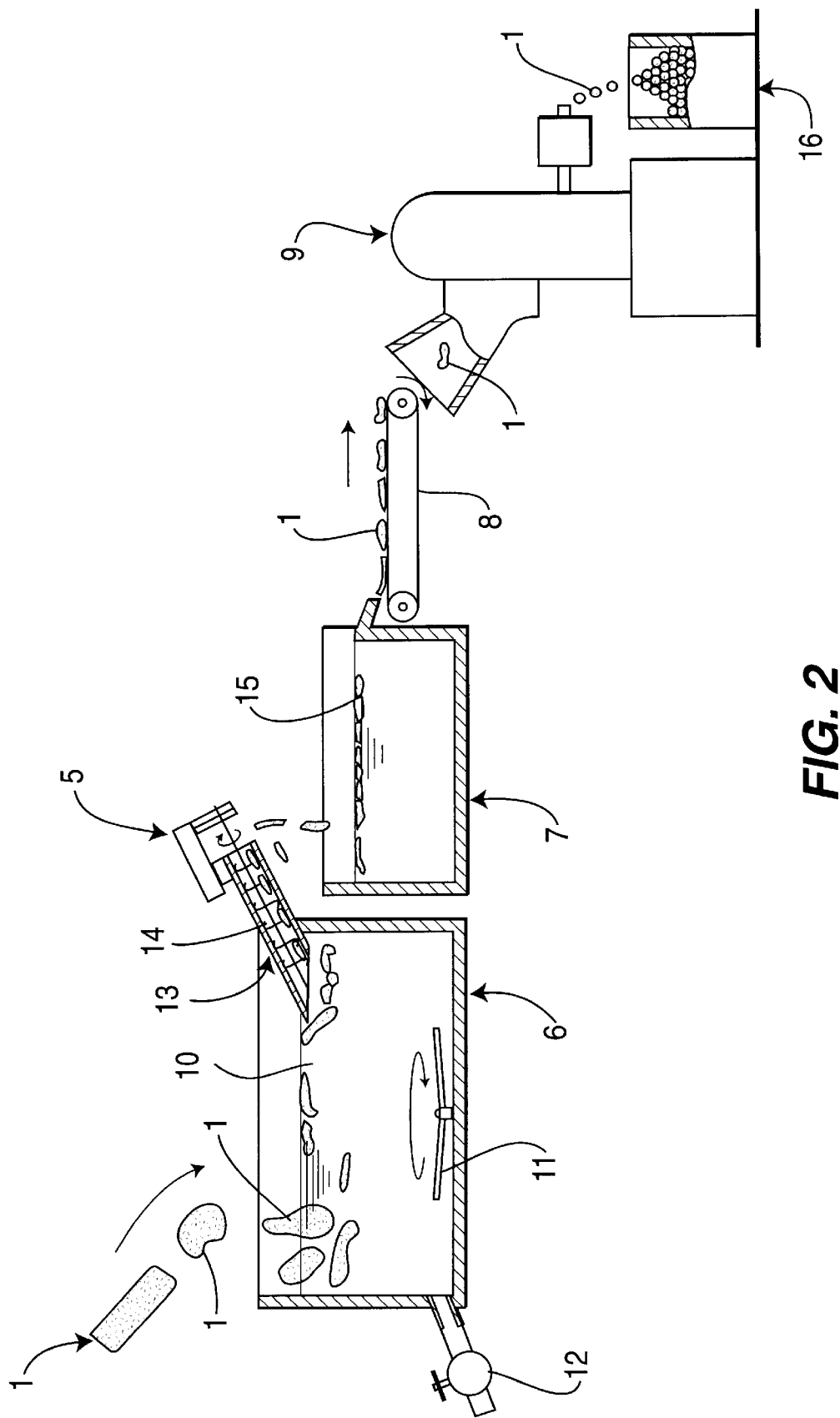
FIG. 2 is a plan view showing an apparatus embodiment of the present invention.

Referring to FIG. 2, there is shown a processing apparatus 5 includes a main vessel 6, a neutralization vessel 7, a conveyer means 8 and a crusher 9. Within the main vessel 6 bath, the volume reducing agent 10 for EPS 1 is filled, and pre-crushed or pulverized EPS 1 or EPS 1 in a shape or a shapeless state are successively added.

The main vessel 6 is equipped with a rotation device 11 for agitating the agent 10 to accelerate the process. Other than the rotation device 11, the supersonic wave vibrator, or ultrasonicator, can be also used as agitation means. Such vibration means do not only enhance and promote the volume reduction process, but also separate the foreign material out of the EPS. It is further preferable to add alternative means such as ion generator, or ionic agent, and tourmaline and the like. The tourmaline may be a solid of less than 30 mm in size, or in particles of less than 30 $\mu$m. Drain valve 12 attached to the main vessel 6 can be opened to drain and discard impurities such as separated and precipitated ink or soil.

EPS 1 put into the main vessel 6 is permeated into the agent 10 and gradually reduced in volume. As seen in FIG. 2, EPS 1 provided into the left side of the main vessel 6 is delivered to the right side of the same bath and reduced in volume for a certain time period, thus the resulting volume-reduced EPS 1 passes through and is entrapped by the entrapping device 13.

The above entrapping device 13 includes a screw feeder and sieve 14 for picking-up EPS 1 reduced in volume which is floating at the right side of the vessel 6, the squeezed and processed EPS 1 being continuously provided to the neutralization vessel 7.

In the neutralization vessel 7 filled with counter agent 15 (neutralizing solution) processed EPS 1 is infiltrated into the neutralizing solution 15. Such solution, for example, a water solution containing 0.01% chlorine or 0.1% hydrogen peroxide prevents the further promotion of gelling or plasticizing reaction of EPS 1 already reduced in volume and enables the EPS 1 to be solidified.

As described above, EPS 1 entered into the vessel 7 passes from the left direction through the right direction of FIG.2 in a floating state and is solidified, and discharged from the vessel 7 and is then delivered by the conveyor means 8, while being dried out, to the crusher 9. Such crusher 9 breaks up EPS 1 into fine pieces and enables the fine pieces to be provided into the bucket 16. Even though not shown, the crusher 9 may be replaced with a compression device to change the processed EPS into pellet, cables or sheets.

Accordingly, finely pieced EPS 1 in the bucket 16 is capable of being re-used as a recycled polystyrene product so that the efficient recycling of synthetic resin sources is accomplished by the present invention.

EXAMPLE 1

Figure 3:
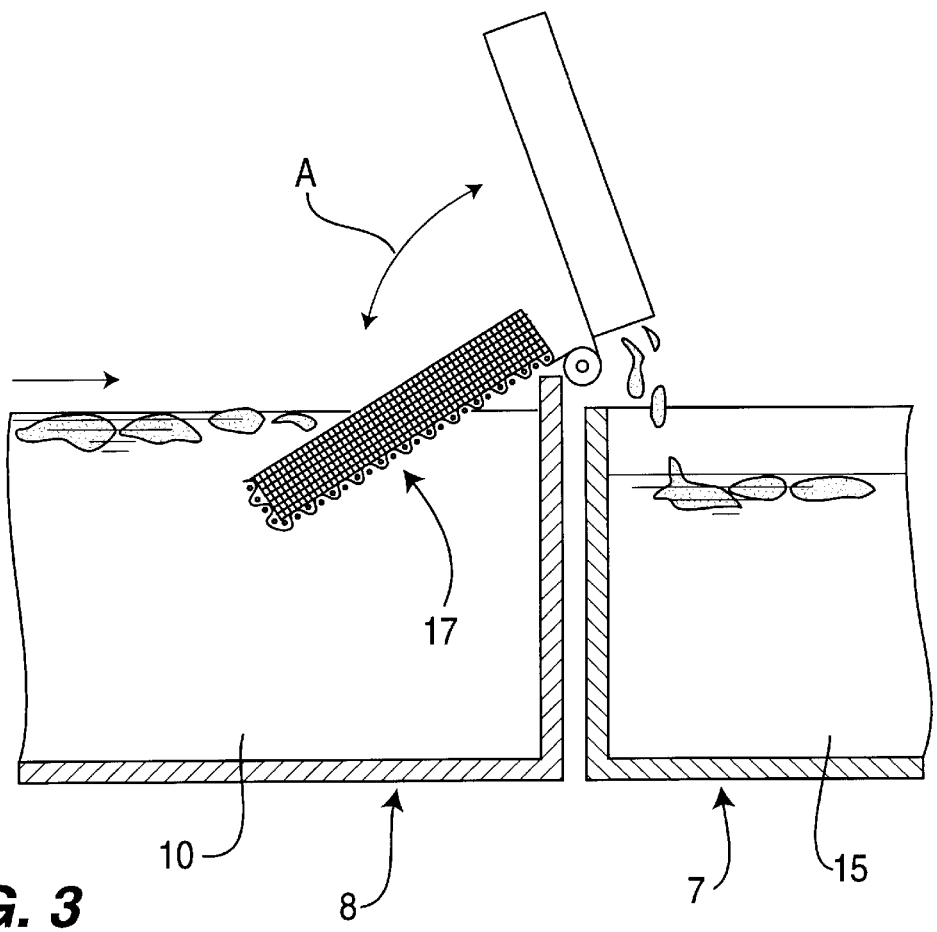
FIG. 3 is a cross-sectional view illustrating the embodiment of an entrapping device used in an embodiment of the present invention.

Referring to FIG. 3, there is shown the simplified embodiment of the entrapping device used in the present apparatus.

The main vessel 6 is filled with the volume reducing agent 10, and the neutralization vessel 7 is for underflowing the neutralizing solution. EPS 1 reduced in volume which is floating along the arrow direction in the bath in main vessel 6 may be picked up by a meshed sieve 17 which intermittently swings in the directions shown by arrow A, and then successively thrown into the neutralization vessel 7. The details on the remainder of the configuration of the process apparatus 5 are arranged in the same manner as shown in FIG. 2.

EXAMPLE 2

Figure 4:
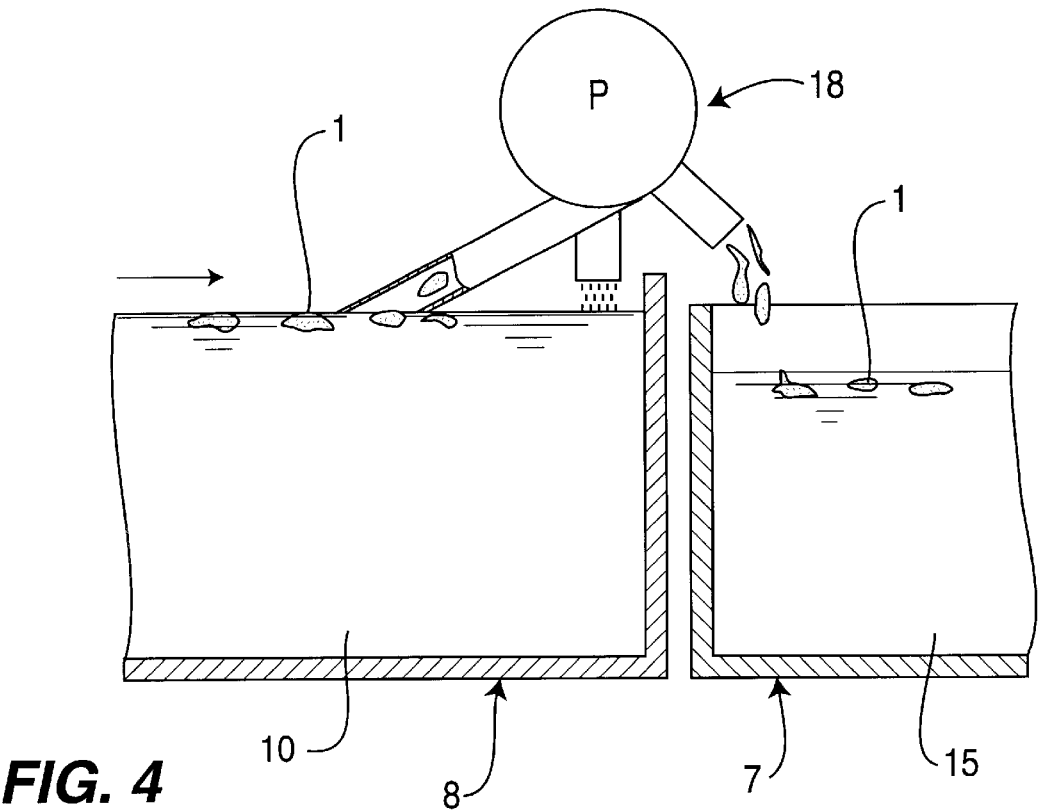
FIG. 4 is a cross-sectional view illustrating another embodiment of an entrapping device used in an embodiment of the present invention.

FIG. 4 shows another modified and more developed embodiment of the entrapping device used in the present apparatus.

The entrapping device includes an aspiration device 18 for sucking EPS 1 reduced in volume which is floating along the arrow direction in the bath in main vessel 6, the aspiration device 18 being capable of delivering sucked EPS 1 from the bath in main vessel 6 to the neutralization vessel 7. The details for other construction parts of the process apparatus 5 are arranged in the same manner as shown in FIG. 2 except where indicated.

Figure 5:
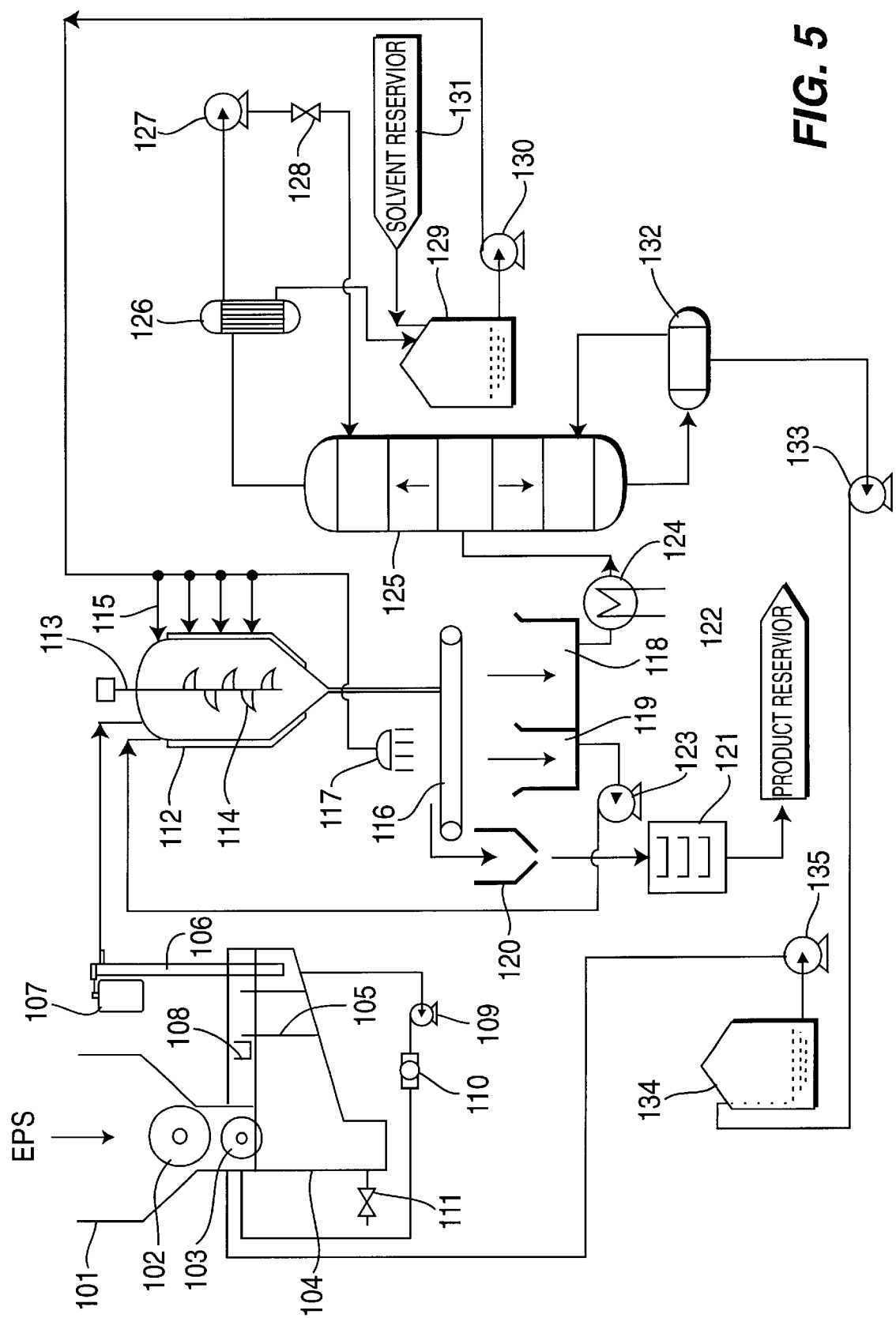
FIG. 5 illustrates an apparatus and volume reducing process for reducing volume of EPS and to recycling or recovering pure polystyrene using a volume reducing agent of an embodiment according to the present invention.

FIG. 5 shows a preferred embodiment of the system for processing EPS and producing higher quality polystyrene from the EPS. Used EPS is usually stained with dirt or has paper or adhesive tape adhering. Such impurities act as an unfavorable factor to lower the quality of EPS reduced in volume, leading to a lower value of final products. Therefore, such impurities may be removed be human labor before processing. Apart from the expense problem, manual removal has the important disadvantage that the removal of such impurities in used EPS to meet the level of final product to sufficiently be recycled for new EPS is practically impossible. However, with the embodiments of the present invention, it may be possible to remove impurities to the highest level and to reduce the volume of EPS without additional labor costs. This results in the rise of the value of the final product to be recycled as the raw material to make new EPS because of having higher purity and the advantage of reducing the volume of EPS without changing the molecular structure of the polystyrene.

Returning to FIG. 5, it is seen that the processing operation is initiated by the placement of used EPS into a hopper 101. If such EPS was heavily contaminated by dirt or the like, it may need to be washed before being thrown into the hopper 101.

A first crusher 102 driven by a motor serves to primarily break the EPS into chunks and to feed them to a second crusher 103, where the pre-treated EPS is crushed into smaller pieces of desired particle size. The first crusher 102 has blades with wider gaps between the blades, a larger outside diameter and a lower rotating speed than that of the second crusher 103, leading to a high efficiency of electricity consumption, permitting a pulverizing efficiency and a uniform torque of the second crusher 103. On the contrary, the second crusher 103, in which the blades have smaller gaps between blades, a smaller outer diameter and a higher rotating speed than that of the first crusher 102, serves to break up EPS into a desirable particle size, depending on the reaction time of the volume reducing agent for EPS. The second crusher 103 may include a certain type of cutter or mill positioned. Pulverized pieces from the secondary pulverizing process are about 10 mm in size, although it depends upon the performance of volume reducing agent.

As a rule, pulverized EPS particles are reduced in volume due to transferring from a solid floating to a gel state by the volume reducing agent. To increase the volume reduction rate and to produce the flow rate causing the movement of EPS toward a screw 106 may be achieved by immersing the blades of second crusher 103 into the volume reducing agent to generate a strong whirlpool. Such whirlpool increases the volume-reducing rate, and the stream of fluid flows along a path 105, and the floating polystyrene flows into the screw 106 driven be motor 107, and is compressed and transported into a chopper 112. In order to increase the reaction rate within this area, ultrasonic vibration or injection of volume reducing agent may be adapted to the present invention. Screw 106 vertically positioned on a main vessel 104 can decrease the volume reducing agent content, that is, the ratio of the volume reducing agent that exists in the processed EPS of reduced volume, to the maximum level by increasing the pressure at the outlet of the screw 106 as much as possible. In case of a square shaped main vessel, resistance due to the right-angled flow reduces the flow rate. Such resistance may be minimized by using a donut-like main vessel having a wider pulverizing area and a narrower screw 106 area in order to lower the flow resistance of flow produced by blade rotation to a minimum.

To remove impurities, at the same time of reducing the volume of the EPS solution, the second crusher 103 generates bubbles by means of additives, if required, to the volume reducing agent. Through a bubble removal path 108, it is possible to remove dirt including dust and other floating impurities. Such agent is circulated by a pump 109 equipped to the main vessel 104 which is streamline-shaped along the path 105, and passes through a filter 10, which removes floating materials or water that exists in the volume reducing agent. Bubble removal path 108 may be of a simple structure and can use paper or cotton textile. Materials of heavier density than the volume reducing agent or separated by ions are collected at the bottom of main vessel 104 to a certain amount, and then drawn off through a valve 111.

The chopper 112 is for extracting polystyrene only as a flake shape out of the floating jellified EPS by means of specific solvents having the affinity to the volume reducing agent. Alternatively, chopper blade 114, driven by motor 113, is to increase the extraction rate of EPS by means of affinity solvent, while the jellified EPS is cut to finer pieces. At the outlet of chopper 112 the mixture composed of fully extracted polystyrene having line particles, affinity solvent and volume reducing agent is discharged, the polystyrene being filtered by a mesh type conveyor 116 and the rest of the solution is extracted downward and collected into a mixed solution bath 118. In order to minimize the amount of affinity solvent injected and to reduce the motor load, multiple ports for supplying solvent are arranged between inlet and outlet parts of the chopper 112. It is preferable to reduce the amount of the volume reducing agent remaining on polystyrene filtered by the mesh type conveyor 116 to the lowest level by rinsing with the solvent. Such used solvent (containing a trace of the volume reducing agent) is temporarily stored in an affinity solvent bath 119 and then re-supplied by pump 123 into the chopper 112. Optionally, the filter 110 can remove impurities. Furthermore, the mixed solution collected in the bath 118 is transported toward a distillation tower 125 in order to implement the purification process to obtain purified volume reducing agent. The resulting polystyrene separated from the mixed solution is successively rinsed by affinity solvent from an affinity solvent nozzle 117 onto the polystyrene, collected into a polystyrene hopper 120, dried in a dryer 121 and finally stored in a product reservoir 122. Such stored raw material may be transferred into the form of an ingot through an extrusion process.

The discharged solution from the mixed solution bath 118 passes through a heat exchanger 124 and is preheated before flowing into the tower 125 and separated into the solvent vapor and the liquid solution of reduction agent within the tower 125, the solvent vapor rising toward a top part of the tower while the liquid is flowing into a reboiler 132 positioned at the bottom part of the tower 125. Such vapor is condensed into the liquid aftinity solvent within a condenser 126, fled to an affinity solvent tank 129, and the stored solvent is delivered again to the chopper 112 in order to remove volume reducing agent from jellified EPS by using a pump 130. Loss of solvent due to the distillation process can be supported by an affinity solvent reservoir 131. Uncondensed vapor in the condenser 126 may be directly discharged into tower 125 through valve 128 or, after the aspirating process by a vacuum pump 127, be released into the surrounding atmosphere.

Moreover, liquid entered into the reboiler 132 is under a heating process to allow the residual affinity solvent components to be vaporized and returned back to the tower 125 while the rest of the liquid and high purity volume reduction agent may be transported by solvent pump 133 into a solution tank 134. Stored agent can be recycled by using a solution recycle pump 135 to the main vessel 104 to reduce the volume of EPS.

As aforementioned in detail, it is apparent, according to the present process and apparatus for using the volume reducing agent, that the volume of used EPS is simply reduced or used EPS may be recycled to provide new material for high quality new EPS.

Therefore, it is understood that EPS having remarkably reduced volume produced by the present invention can be conveniently and simply stored or transported to any of desired sites. It is also possible to provide any temporary treatment installations without occupying substantial space. Additionally, it will be evident that the process and apparatus of the present invention are environmentally advantageous because the recycling process of used EPS for new EPS may be realized.

As compared to conventional prior arts, the present invention can provide a safe and improved recycling process for EPS based organic materials without generating toxic gas (for example, limonene). The present invention is advantageous in reducing the volume of used EPS on the actual location and, because of the easy storage and transportation thereof, to noticeably save transporting and storage expenses. Accordingly, the present invention may be a solution to social problems in connection with landfill space for waste, traffic and air pollution due to the transportation of waste.

Additionally, as a result of performing the present invention it is possible to easily produce polystyrene products having plasticity and use these products, leading to the saving of production costs for manufacturing a lot of parts, such as electronic appliances. Moreover, it is also possible to effectively utilize petroleum resources by recycling used polystyrene.

As previously discussed, the present invention provides a safe and efficient method and apparatus to reduce the volume of EPS and to raise the recycling capacity thereof.

It will be apparent to those skilled in the art that various modifications and variations of the present invention can be made without departing from the spirit or scope of the invention. Thus, it is intended that the present invention cover the modifications and variations of this invention provided they come within the scope of the appended claims and their equivalents.

What is claimed is:

1. A method of processing expanded polystyrene (EPS), comprising the steps of:
   obtaining a volume reducing agent, said volume reducing agent comprising:
      a first plasticizer having a Ferdor solubility parameter value less than that of the expanded polystyrene (EPS) to be processed;
      a second plasticizer having a Ferdor solubility parameter value of greater than that of the expanded polystyrene (EPS) to be processed; and
      said volume reducing agent being a liquid at room temperature and having a Ferdor solubility value close to that of polystyrene (PS) to be processed;

dipping the expanded polystyrene (EPS) into the volume reducing agent to yield a volume-reduced polystyrene; and dipping the volume-reduced polystyrene in a neutralization solution.

2. The method of claim 1, further comprised of said first plasticizer being present in the range of 65 to 97 weight-% of the volume reducing agent and said second plasticizer being present in the range of 3 to 35 weight-% of the volume reducing agent.

3. The method of claim 1, further comprised of said first plasticizer having a Ferdor solubility parameter value in the range of approximately 7.1 to 10.0 $(cal/cm^3)^{1/2}$; and said second plasticizer having a Ferdor solubility parameter value in the range of approximately 10.2 to 15.6 $(cal/cm^3)^{1/2}$.

4. The method of claim 1, further comprised of said volume reducing agent further comprising any one of an anionic agent and tourmaline in the range of 0.01 to 10 weight-% of the volume reducing agent.

5. The method of claim 1, further comprised of said neutralization solution being an aqueous solution of any one of chlorine and hydrogen peroxide.

6. The method of claim 1, further comprising the step of:

crushing the expanded polystyrene (EPS) before dipping the expanded polystyrene (EPS) into the volume reducing agent.

7. The method of claim 1, further comprised of said first plasticizer being any one of a dicarbonate diester and a carbonate ester, and said second plasticizer being any one of an amino alcohol, an alcohol and an ester.

8. The method of claim 6, further comprising the step of washing the expanded polystyrene (EPS) before crushing.

9. The method of claim 6, further comprised of said crushing step comprising crushing with a first crusher followed by crushing by a second crusher having a smaller blade diameter and a faster rotating speed than the first crusher.

* * * * *